UNITED STATES PATENT OFFICE.

ERNST JACOBY, OF MUNICH, GERMANY, ASSIGNOR TO DIAMALT AKTIENGESELL-SCHAFT, OF MUNICH, GERMANY, A CORPORATION OF GERMANY.

PROCESS OF TREATING YEAST.

1,078,288.  Specification of Letters Patent.  Patented Nov. 11, 1913.

No Drawing.  Application filed December 10, 1912. Serial No. 735,897.

*To all whom it may concern:*

Be it known that I, ERNST JACOBY, a subject of the German Emperor, residing at Munich, Germany, have invented certain new and useful Improvements in Processes of Treating Yeast, of which the following is a specification.

My invention relates to a novel method of treating yeast for the purpose of improving its qualities, as more fully hereinafter described.

It is generally recognized that oxygen has a favorable effect on yeast, and it is upon this fact that various processes are based for producing yeast by means of aeration. All these processes necessitate the use of expensive installations. The use of ozone has also been suggested to increase the preservative and fermentative qualities of yeast. Experiments have, however, demonstrated that not only does ozone fail to produce the desired effect, but that large quantities of ozone act to greatly weaken or entirely kill the yeast cells.

The primary object of my invention is to provide a simple and cheap process of treating yeast whereby the several disadvantages above pointed out are entirely obviated.

My novel process consists, essentially, in adding persalts to the yeast while the latter is in moist condition. Small quantities, only, of the persalts are required, the exact quantity to be added to any given amount of yeast can be readily determined by experiment.

The following example will serve to illustrate the manner in which my improved process may be practised. Prepared yeast is dissolved in four to eight times its quantity of water, the persalt is then added to the solution and the latter is stirred for about one-half hour. The yeast is then allowed to settle, is removed from the liquid and pressed into form for commercial use. The quantity of persalt used depends on the acid content of the yeast. In treating pressed beer yeast with sodium percarbonate, I add to the yeast a quantity of sodium percarbonate equivalent to from one to one and one-fourth per cent. of the weight of the yeast, and in treating grain yeast with the same substance, I add to the yeast a quantity of sodium percarbonate equivalent to from one-half to three-fourths per cent. of the weight of the yeast. The usually unpleasant smell of brewer's yeast disappears; the yeast has a fine aromatic odor, becomes tasteless and almost white in color. Concurrently with this improvement in external qualities, there is a strengthening of the organism; the growth is accelerated and the loss of yeast is decreased.

When yeast, treated as herein described, is used in baking the dough rises more quickly in the oven than when ordinary yeast is employed, the article baked is improved in form, and its odor is pleasantly aromatic. If persalts having an alkaline reaction are employed, as for example percarbonate of sodium, the preservative qualities which result from the presence of the oxygen are augmented, because by freeing the alkalis the subsequent acidulation of the yeast is decreased and consequently a loss of substance is prevented for a time.

I am aware that it has heretofore been proposed to treat yeast with alkalis alone, and while the preservative qualities are thus somewhat increased, its other qualities suffer noticeable deterioration. The raising power of the yeast decreases materially, its color becomes dark and its taste is detrimentally affected. The alkaline reaction lessens the availability of the yeast for purposes of consumption and baking, and also assists in increasing the fungi which develop particularly on alkaline ground.

What I claim as new and desire to secure by Letters Patent is:—

1. The herein described process of treating yeast, which consists in adding to moist yeast nonpoisonous persalts adapted to preserve the yeast and increase its fermentative properties.

2. The herein described process of treating yeast, which consists in adding persalts having an alkaline reaction to moist yeast.

3. The herein described process of treating yeast, which consists in adding percarbonate of sodium to moist yeast.

In testimony whereof I have affixed my signature in presence of two witnesses.

ERNST JACOBY.

Witnesses:
 JOHANNA STERN,
 RICHARD LEMP.